A. GRANDI.
COCK.
APPLICATION FILED APR. 8, 1915.

1,171,189.

Patented Feb. 8, 1916.

Inventor:
Alfredo Grandi
By
Attorney

UNITED STATES PATENT OFFICE.

ALFREDO GRANDI, OF BOLOGNA, ITALY.

COCK.

1,171,189.  Specification of Letters Patent.  Patented Feb. 8, 1916.

Application filed April 8, 1915. Serial No. 19,923.

*To all whom it may concern:*

Be it known that I, ALFREDO GRANDI, a subject of the King of Italy, residing at Bologna, Italy, have invented certain new and useful Improvements in Cocks, of which the following is a specification.

This invention relates to cocks in which the valve comprises a ball connected with play to an eccentric member operated by the controlling handle, and has for its object a construction in which the outer surface of the ball is free of contact with its support.

Another feature of the cock according to the present invention is that the seat for the ball valve is made in a vertical wall of the casing of the cock so that the ball, owing to its weight, may remain removed from its seat, when there is no pressure in the piping, even though the operating lever or handle is in closed position, said ball valve being closed automatically when the pressure is increased in the piping.

Cocks are known in which a ball valve is mounted with play in a stirrup or cage pivoted to or connected with the controlling lever, but in the cock according to this invention the ball valve is mounted on an eccentric pin carried by a rotatable support connected to the operating lever, said pin being inserted with play in a diametrical recess in the ball. By this mounting the outer surface of the ball does not contact at all with its support so that said surface cannot be damaged and the ball is prevented from becoming engaged with its support. Further the area of contact between the ball and the pin, while allowing of exerting the strain required for moving the ball from its seat, is very much reduced, and is, moreover, very near to the axis of the ball so that the latter may turn easily under the action of the fluid on being removed from its seat, the portion of the ball contacting with the seat being thus varied at each operation.

Figure 1:
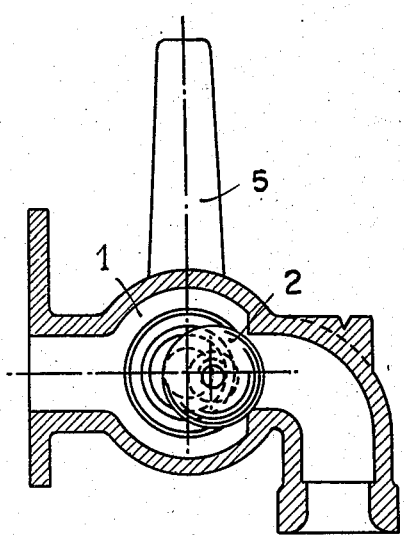
Figure 2:
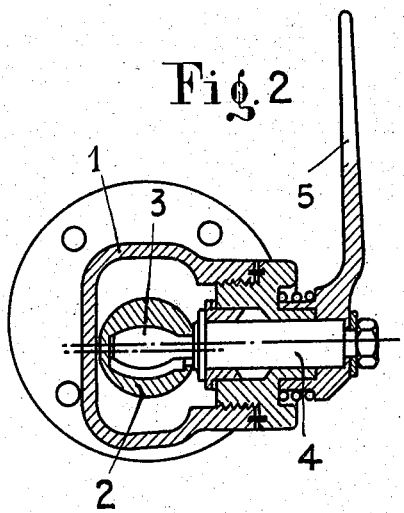
Figure 4:
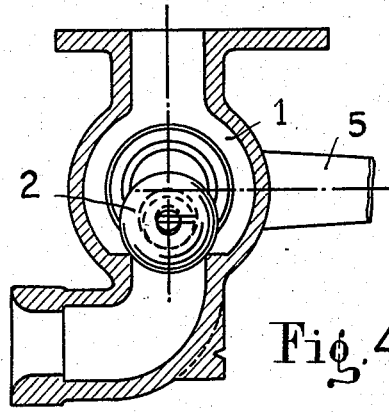
Figure 3:
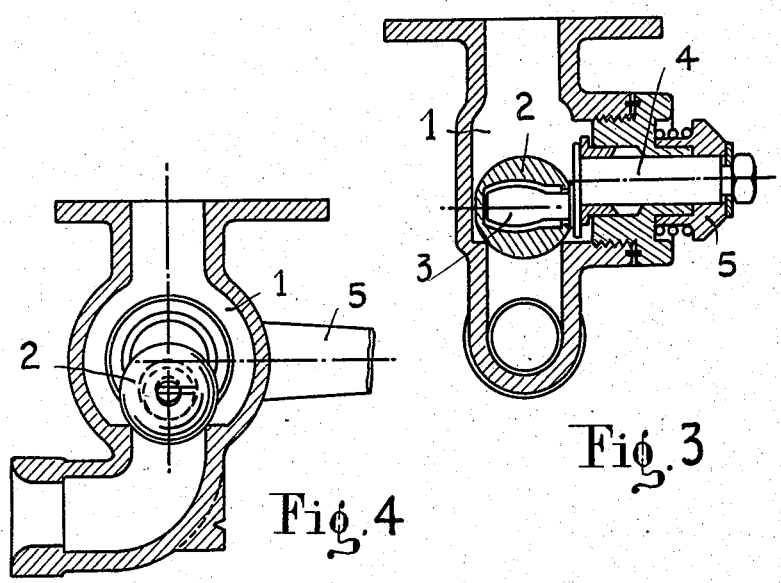

The annexed drawing shows by way of example one construction of the cock according to this invention and Figure 1 is a longitudinal section; Fig. 2 is a transverse section; Fig. 3 is a horizontal section; Fig. 4 shows another arrangement of the cock.

As shown in said drawing, a ball 2 is mounted in the casing 1 of the cock, said ball being provided with a diametrical recess in which is inserted with play a pin 3 supported by and eccentric with regard to the shaft 4, or other rotatable pivot to which the operating lever 5 is secured. The shaft or pivot 4 may be mounted in any suitable manner, and, as shown, is mounted in a stuffing gland.

When the valve seat is arranged in casing 1 in a vertical plane as shown in Fig. 1, the ball 2 may remain removed from said seat, even though the lever 5 is in closed position, owing to its loose mounting on pin 3 and to the action of its own weight, when there is no pressure in the casing 1. In that way the valve is closed only when there is a pressure in the piping pushing the ball against its seat, the parts of the valve being thus prevented from being damaged when it is out of operation. An automatic operation is thus obtained enabling the cock to be used in water gages and in steam pipes, and in the latter case the automatic discharge of the condensation water is also obtained when the steam is cut off.

Owing to the loose mounting of the ball with regard to the pin 3, a different portion of the ball comes in contact with the seat at each operation of the lever, and further the heat transmission to the operating lever is reduced to a minimum.

When required the cock may be arranged as shown in Fig. 4, in which the seat is located under the ball which is maintained in contact with it by its own weight. In any case the ball does not need to be positively maintained on its seat by the controlling lever. Finally the operation of the valve is a very easy one owing to the fact that the pin 3 acts eccentrically in the hole of the ball and thus causes the same to roll on its seat and to be removed gradually from it.

By means of the described construction a cock is obtained which is very durable and solid and in which the requisite tight fit between the valve and its seat is effected by the pressure of the fluid stopped by the cock.

I claim as my invention:—

1. In a cock, the combination, with a casing having a valve seat therein, of a ball valve disposed within said casing and provided with a diametrically-arranged recess; a supporting member for said valve projecting into said recess and having play therein, said member forming an axis about which said valve is adapted to roll automatically; and means for shifting said member, to raise or lower said valve.

2. In a cock, the combination, with a casing having a valve seat therein; of a ball valve disposed within said casing and provided with a diametrically-arranged recess; a supporting member for said valve projecting into said recess and having play therein, said member forming an axis about which said valve is adapted to roll automatically; a rotatable member journaled in said casing and to which said supporting member is eccentrically secured; and a handle secured to said rotatable member for rotating the same, to raise or lower said valve.

3. In a cock, the combination, with a casing having a vertically-arranged valve seat therein; of a ball valve within said casing and provided with a diametrically-arranged recess; a supporting member for said valve projecting into said recess and having play therein, said member forming an axis about which said valve is adapted to roll automatically; and means for shifting said member, to move said valve to a position slightly removed from said seat whereby it is adapted to be moved by fluid pressure into tight engagement with said seat.

In testimony whereof I affix my signature in presence of two witnesses.

ALFREDO GRANDI.

Witnesses:
   ALEXANDRE CAPPELLO,
   PIETRO ALLEGRI.

Copies of this patent may be obtained for five cents each, by addressing the "Commissioner of Patents, Washington, D. C."